US011092372B2

(12) United States Patent
Blosser

(10) Patent No.: US 11,092,372 B2
(45) Date of Patent: Aug. 17, 2021

(54) STORAGE AND DISTRIBUTION UNIT FOR COMPRESSED ICE

(71) Applicant: Greg L. Blosser, Barnesville, GA (US)

(72) Inventor: Greg L. Blosser, Barnesville, GA (US)

( * ) Notice: Subject to any disclaimer, the term of this patent is extended or adjusted under 35 U.S.C. 154(b) by 0 days.

(21) Appl. No.: 15/860,037

(22) Filed: Jan. 2, 2018

(65) Prior Publication Data

US 2018/0187939 A1    Jul. 5, 2018

Related U.S. Application Data

(60) Provisional application No. 62/441,686, filed on Jan. 3, 2017.

(51) Int. Cl.
| | |
|---|---|
| *F25C 1/147* | (2018.01) |
| *F25C 5/20* | (2018.01) |
| *F25C 5/182* | (2018.01) |
| *G07F 17/00* | (2006.01) |
| *F25C 1/04* | (2018.01) |

(52) U.S. Cl.
CPC ............... *F25C 1/147* (2013.01); *F25C 1/04* (2013.01); *F25C 5/182* (2013.01); *F25C 5/24* (2018.01); *G07F 17/0071* (2013.01); *F25C 2400/10* (2013.01); *F25C 2500/08* (2013.01); *Y02P 60/85* (2015.11)

(58) Field of Classification Search
CPC .. F25C 1/147; F25C 5/24; F25C 5/182; F25C 1/04; F25C 2500/08; F25C 2400/10; G07F 17/0071; Y02P 60/855
USPC .......................................................... 62/344
See application file for complete search history.

(56) References Cited

U.S. PATENT DOCUMENTS

| 3,225,968 A | 12/1965 | Winkler et al. |
| 3,329,223 A | 7/1967 | Swanson et al. |
| 3,896,631 A | 7/1975 | Morrison |
| 4,328,681 A * | 5/1982 | Sakamoto ............... F25C 1/147 |
| | | 62/157 |

(Continued)

FOREIGN PATENT DOCUMENTS

| WO | WO2004057248 | 7/2004 |
| WO | WO2008061179 | 5/2008 |

(Continued)

OTHER PUBLICATIONS

The International Search Report/Written Opinion issued in the corresponding international application, PCT/US2018/012038, by the U.S. Patent Office as International Search Authority dated Mar. 6, 2018; 9 pages.

*Primary Examiner* — Steve S Tanenbaum
(74) *Attorney, Agent, or Firm* — Chicago IP Law; Steven M. Evans

(57) ABSTRACT

An on-demand and efficient ice delivery unit is described. In an aspect, the unit is comprises a cabinet that further comprises an ice storage bin and an icemaker. The ice delivery unit provides a user with compressed chewable nuggets of ice. In an aspect, the unit comprises an icemaker that is ideally located below the ice storage bin. The location of the icemaker, which may also be remote, is designed to enable the ice storage bin to be of a larger capacity than ice delivery units currently known in the art. Additionally, the location of the icemaker reduces the overall size, particularly the height, of the unit in comparison to other ice distribution units known in the art.

16 Claims, 11 Drawing Sheets

(56) References Cited

U.S. PATENT DOCUMENTS

| | | |
|---|---|---|
| 5,104,007 A | 4/1992 | Utter |
| 5,987,900 A * | 11/1999 | Love ................... B67D 1/0857 |
| | | 62/348 |
| 6,134,908 A | 10/2000 | Brunner et al. |
| 6,153,105 A | 11/2000 | Tadlock et al. |
| 6,761,036 B2 | 7/2004 | Teague et al. |
| 7,469,548 B2 | 12/2008 | Brunner et al. |
| 8,365,951 B2 | 2/2013 | Jennison |
| 8,756,950 B2 * | 6/2014 | Brunner ................ F25C 1/147 |
| | | 62/344 |
| 9,134,060 B2 | 9/2015 | Seymour |
| 2005/0103039 A1 * | 5/2005 | Vorosmarti ............ F25C 5/20 |
| | | 62/344 |
| 2005/0193759 A1 | 9/2005 | Brunner et al. |
| 2006/0005553 A1 | 1/2006 | Metzger |
| 2007/0240441 A1 | 10/2007 | Hobson et al. |
| 2008/0196788 A1 | 8/2008 | Dalton et al. |
| 2010/0250005 A1 | 9/2010 | Hawkes et al. |
| 2010/0294618 A1 | 11/2010 | Jennison |
| 2011/0041542 A1 | 2/2011 | Brunner et al. |
| 2012/0024000 A1 | 2/2012 | Lee et al. |
| 2012/0031054 A1 | 2/2012 | Broadbent |
| 2012/0186202 A1 | 7/2012 | Pandurangan et al. |
| 2012/0198870 A1 | 8/2012 | Erbs et al. |
| 2013/0133296 A1 | 5/2013 | Metzger |
| 2014/0053949 A1 * | 2/2014 | Witt ....................... B65B 43/36 |
| | | 141/83 |
| 2014/0102582 A1 | 4/2014 | Venet, III et al. |
| 2014/0290187 A1 | 10/2014 | Shaker et al. |
| 2016/0003515 A1 | 1/2016 | Brunner et al. |
| 2016/0025398 A1 * | 1/2016 | Seymour ............ G07F 17/0071 |
| | | 62/66 |

FOREIGN PATENT DOCUMENTS

| | | |
|---|---|---|
| WO | WO2010014465 | 2/2010 |
| WO | WO2012162303 | 11/2012 |
| WO | WO2016210071 | 12/2016 |

* cited by examiner

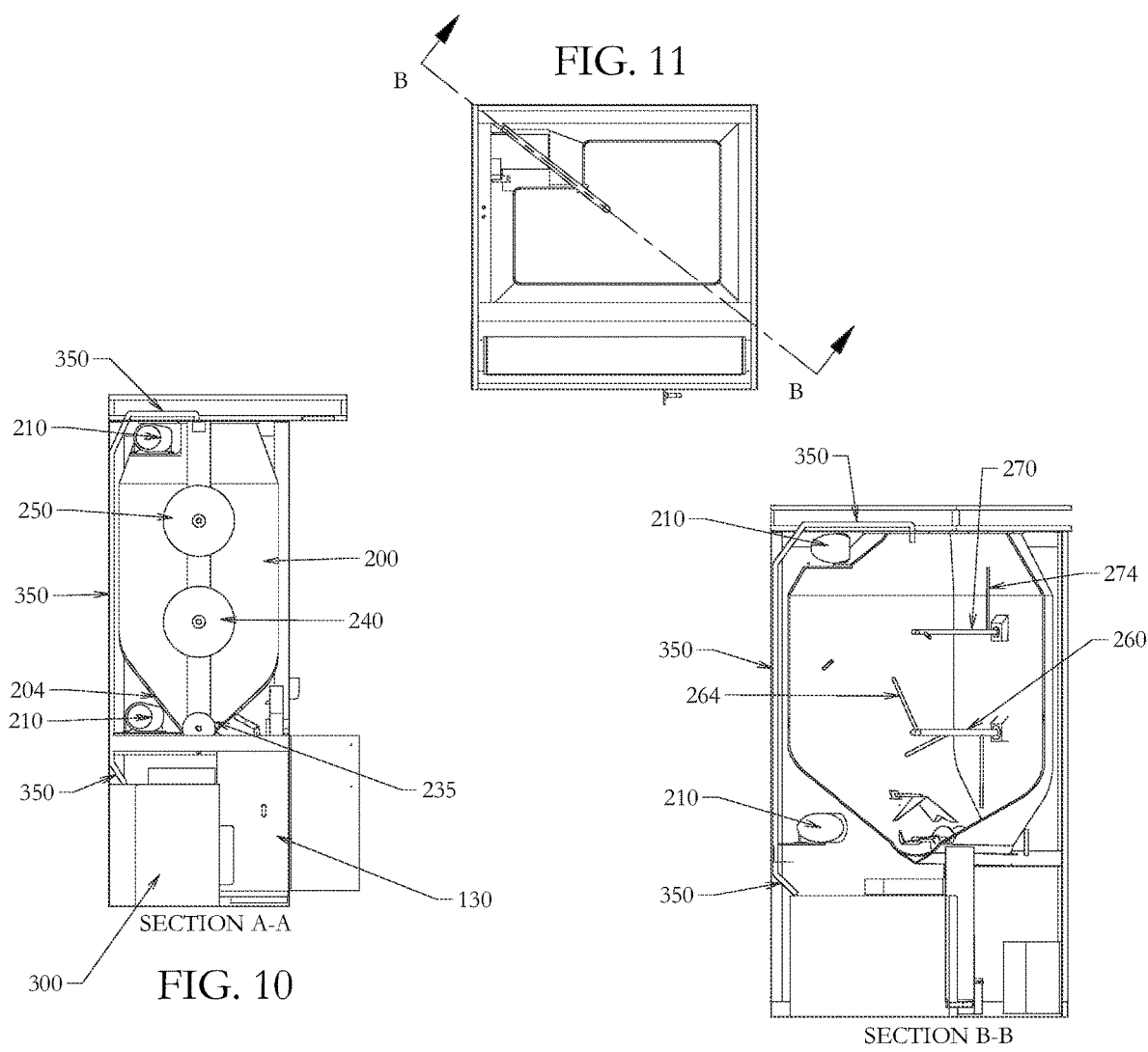

STORAGE AND DISTRIBUTION UNIT FOR COMPRESSED ICE

CROSS-REFERENCE TO RELATED APPLICATIONS

The present application claims priority from U.S. Provisional Patent Application No. 62/441,686, filed on Jan. 3, 2017, the disclosure of which is relied upon and incorporated herein by reference.

FIELD OF INVENTION

This invention generally relates to ice producing units and particularly to dispensers that fill a bag with ice on demand.

BACKGROUND OF THE INVENTION

In the food and beverage service industries, it is desirable to provide means for conveniently dispensing a quantity of ice. Prior art methods include providing pre-bagged ice. However, such ice delivery has problems, including the ice becoming stale, exposed to environmental elements when bags are ripped during transport and storage, and bridged (i.e., cubes sticking to one another, requiring the ice to be broken up by the consumer after purchase).

On-site ice producing machines, including free standing ice bagging machines, have been used to address the deficiencies of pre-bagged ice suppliers. For example, the majority of prior art ice delivery units, such as the one disclosed in U.S. Pat. No. 9,134,060, use commercially available ice makers oriented above an insulated storage bin. These units utilize icemakers with a freezer plate to make the ice. Water flows over the plate, collecting in trays to form cubes. When it is time to harvest the cubes, the cubes are released from the tray (usually through the application of hot Freon gas). In order for the cubes to be collected in a bin, gravity is utilized, requiring the icemaker to be placed at the top or over the bin. Further, in order to prevent the ice from clogging at the icemaker, there must be a sufficient distance between the bin and the icemaker, requiring prior art ice delivery units to provide a great amount of clearance between the icemaker and the bin, leading to less storage space available.

Given the aforementioned challenges, it is desirable to have an ice delivery that overcomes such difficulties.

SUMMARY OF THE INVENTION

This invention relates to a public, on-demand and efficient ice delivery unit. In an aspect, the unit comprises a cabinet that further comprises an ice storage bin and an icemaker. The icemaker produces compressed chewable nuggets of ice. In an aspect, the icemaker is located below the ice storage bin. The location of the icemaker is designed to enable the ice storage bin to be of a larger capacity than ice delivery units currently known in the art. Additionally, the location of the icemaker reduces the overall size, particularly the footprint and height, of the unit in comparison to other ice distribution units known in the art.

In an aspect, the ice is delivered to the unit form the icemaker in a closed loop system/circuit. In an aspect, the closed loop system utilizes tubing. The tubing is insulated and configured to provide ice from the icemaker through a compression nozzle and harvesting auger to the ice storage bin of the ice delivery unit. The closed loop system enables improved ice storage capacity in comparison to other icemaker and delivery units known in the art. The closed loop system comprises a lid configured for the storage bin that can be readily removed to allow for cleaning and sanitizing of the inside of the ice storage bin. In an aspect, the lid, when in place, reseals the ice storage bin, such that the presence and possibility of external contaminants (e.g. dust, bugs, bacteria, and dirt) within the stored ice supply is eliminated. The lid seals an opening through which insulated tubing from the icemaker is inserted in order to deliver compressed nugget ice to the ice storage bin. In an aspect, the tubing is extendible and flexible to enable versatility in its placement and arrangement.

In an aspect, the ice delivery unit features a delivery chute configured for only one-way delivery (i.e. egress). In addition, the delivery chute is oriented at the bottom center of the ice storage bin and is configured to conveniently provide ice to a user of the ice delivery unit. In an aspect, the ice storage bin comprises an auger with opposing auger flights (e.g. right hand and left hand flights). The auger operates such that ice is directed to the opening located at the center bottom of the ice storage bin. The unique design of the opening and auger system reduces the overall size of the ice delivery unit while increasing the time and energy efficiency for ice delivery to the client. In an aspect, the auger system is configured to drive ice within the ice storage bin to the center of ice storage bin where it may then be discharged into a specially designed ice chute and bag holder system.

In an aspect, the ice delivery unit comprises a thermal exchange system. In an aspect, the thermal exchange system is configured such that water from melted ice within the ice storage bin is used to initially cool new water to be used by the icemaker. The new water is then further cooled while within a flexible supply tube delivering the water to the icemaker through an attachment at the bottom of the ice storage bin. In an aspect, the thermal exchange system improves the overall efficiency of the icemaker of the ice delivery unit.

In an aspect, the ice delivery system is configured such that ice is routinely agitated while stored within the ice storage bin. Agitation of the ice ensures that the ice is unbridged (i.e., the ice cubes remain separate and do not melt or stick to one another) such that it flows freely into a user's bag/receptacle during vending. In an aspect, the ice delivery unit is configured to secure a bag/receptacle such that it remains in place while a user dispenses ice from the unit.

Other features and advantages of the invention will become apparent to one with skill in the art upon examination of the following drawings and detailed description. It is intended that all such additional features and advantages be included herein within the scope of the present invention.

BRIEF DESCRIPTION OF THE FIGURES

FIG. 7 is a cross-sectional view of an icemaker of an ice delivery unit according to the present invention.

FIG. 10 is a cross-sectional view of the ice delivery unit of FIG. 9 along line A-A.

FIG. 11 is a top plan view of the ice delivery unit of FIG. 8.

FIG. 12 is a cross-sectional view of the ice delivery unit of FIG. 11 along line B-B.

DETAILED DESCRIPTION OF THE INVENTION

Figure 1:
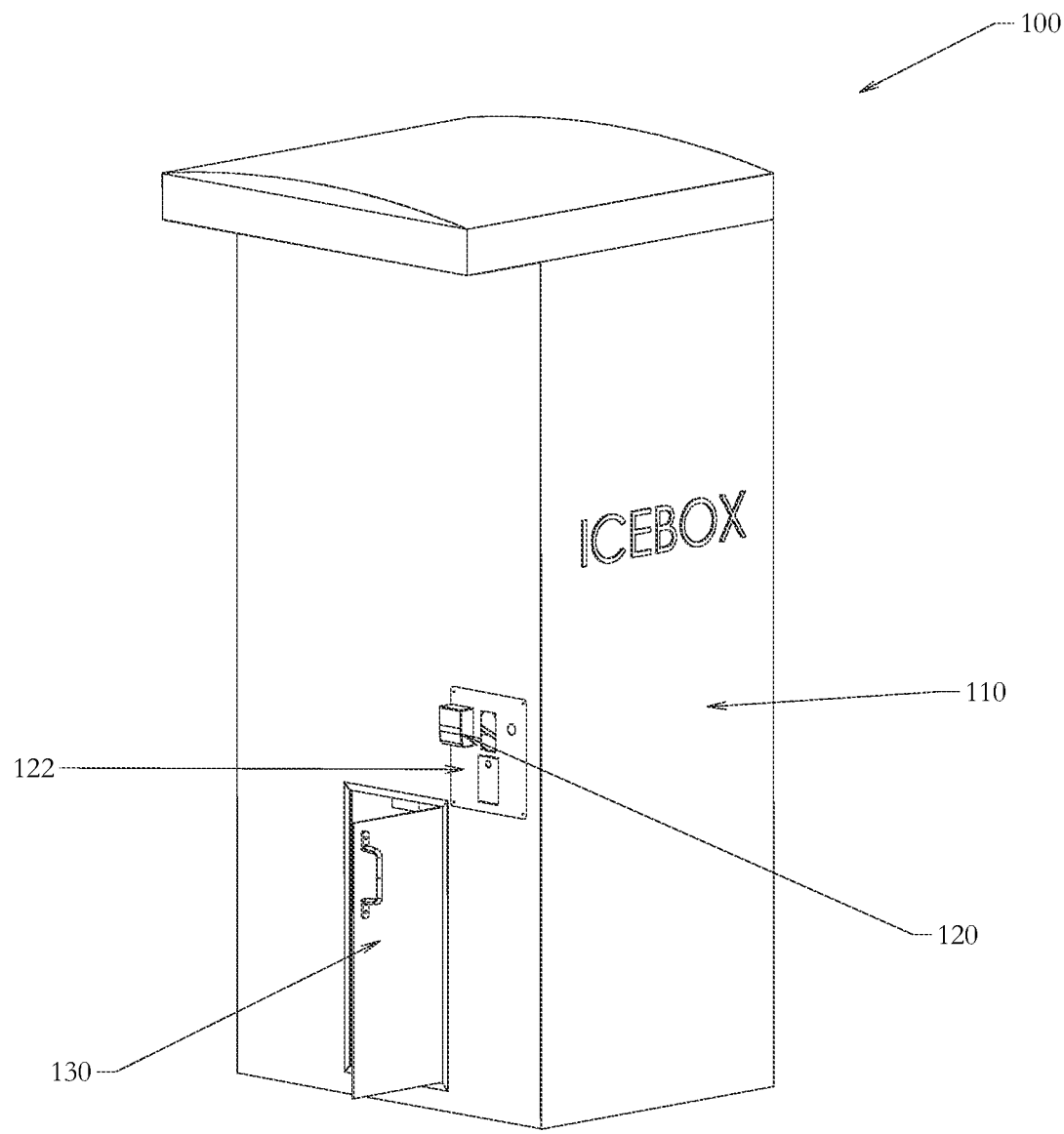
FIG. 1 is an elevated perspective view of an ice delivery unit according to aspects of the present invention.
Figure 2:
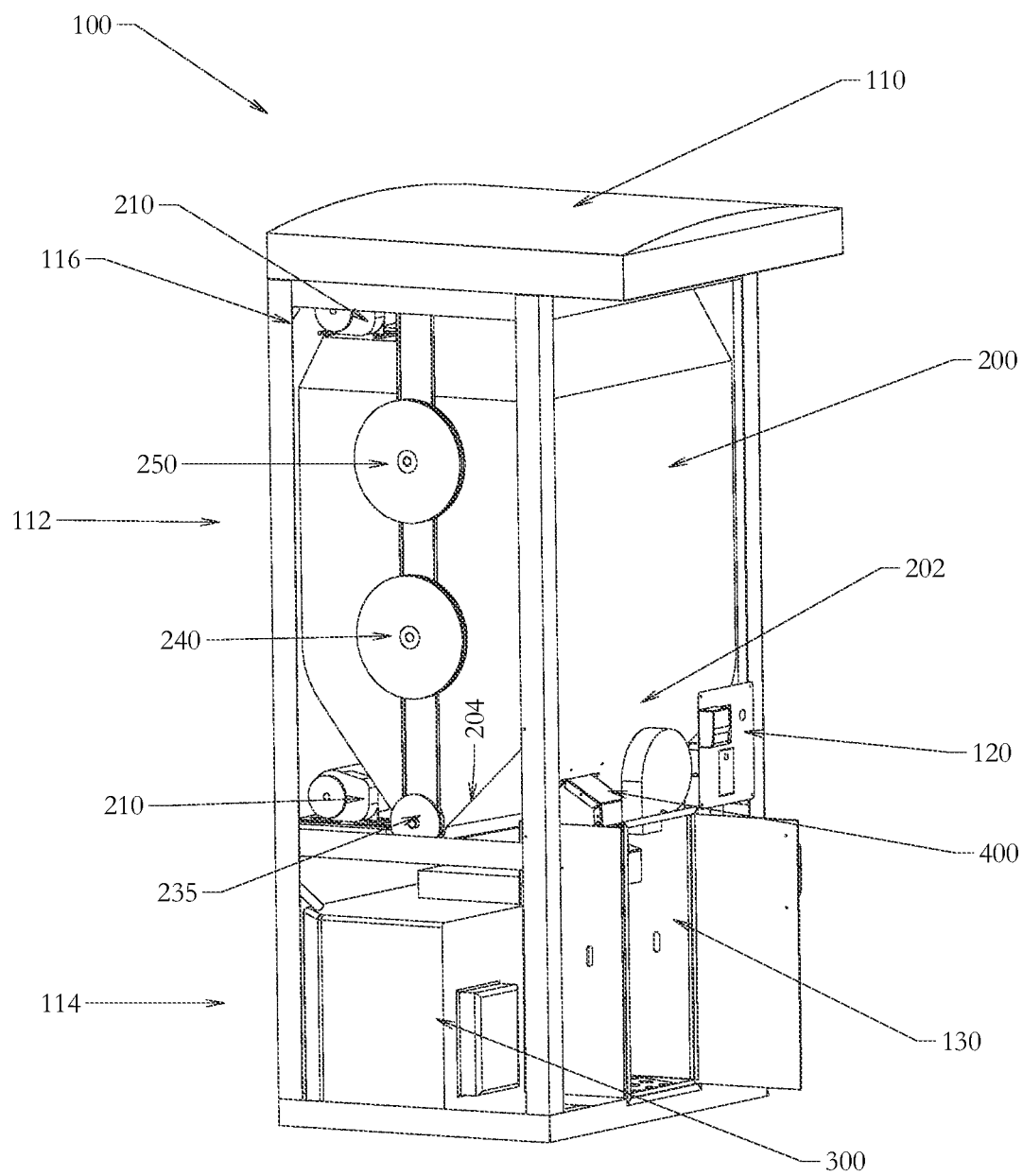
FIG. 2 is a partial see-through isometric view of components internal to the ice delivery unit of FIG. 1.

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the following description, numerous specific details are set forth. However, it is to be understood that embodiments of the invention may be practiced without these specific details. In other instances, well-known methods, structures and techniques have been shown in detail in order not to obscure an understanding of this description.

The present invention is directed towards ice delivery unit 100. FIGS. 1-15 illustrate an ice delivery unit 100 according to aspects of the present invention. The ice delivery unit 100 is configured to produce and distribute ice on-demand to a user. The ice delivery unit 100 is configured for use in public spaces, including, but not limited to, indoor and outdoor locations, convenience stores, outside grocery stores, marinas, state parks, amusement centers, truck stops, shopping centers, and other places where users can freely access the unit 100.

The configuration of the components, discussed in detail below, allow the ice delivery unit 100 to have a smaller footprint per pound of available ice storage than ice delivery units known in the art. For example, most prior art delivery units have dimensions that range anywhere between five (5) feet deep and four (4) feet wide to three (3) feet deep and seven (7) feet wide, with heights that range between nine (9) and ten (10) feet high. In an aspect, the ice delivery unit 100 is configured to be between approximately forty-two (42) inches to approximately fifty-eight (58) inches in width, approximately thirty-five (35) inches deep, and a height of approximately seventy-to (72) inches to eighty-four (84) inches. In such an aspect, the footprint of the ice delivery unit 100 is greatly reduced.

As discussed above, the primary location for the ice delivery unit 100 will be in outdoor locations, namely on sidewalks outside various businesses. Since most sidewalks today are designed to be six feet and six inches in width for ADA purposes, by keeping the depth of the ice delivery unit 100 to approximately thirty-five inches in depth, approximately three feet and six inches of space between the ice delivery unit 100 and the curb is provided, allowing for a wheel chair to pass safely by the unit. While the ice delivery unit 100 can be used in outdoor applications, it can be used in indoor setting as well. In an aspect, the depth of the ice delivery unit 100 allows the unit 100 to be transferred through doorframes of commercial settings, which are required to be 36 inches in width, when the depth of the unit 100 is 35 inches. In other aspects, the ice delivery unit 100 can have a variety of dimensions.

In an aspect, ice is provided to the user through the ice delivery unit 100 within a cabinet 110 comprising an ice storage bin 200 and an icemaker 300. The ice delivery unit 100, including the cabinet 110, can be largely constructed from a combination of materials including, but not limited to, galvanized and/or stainless steel, Lexan or other plastic, various forms of glass, acrylic powder coatings, and polyurethane insulation. In an exemplary aspect, the storage bin 200 and metallic components attached to it are coated, on the exterior, with an insulation foam in order to prevent condensation within the interior of the storage unit 200. This is especially effective and necessary for ice delivery units 100 attempting to be rodent proof by eliminating drain holes in the cabinet 110. In an aspect, the cabinet 110 is absent drainage holes.

In an aspect, the ice delivery unit 100 features a user accessible control unit 120. The control unit 120 is configured to receive input from a user desiring a distribution of ice. Although the control unit 120 is housed internal in the cabinet 100 to the ice delivery unit 100, the user interface of the control unit 120 is accessible externally (e.g., placed on the exterior of the cabinet 110) to the ice delivery unit 100 via a user interface 122. In an aspect, the user interface 122 can be a touchscreen, a keypad, a mobile device interface, a voice controlled interface, or any other interface known in the art to be suitable for receiving input from a user. In an aspect, the control unit 120 can be configured to use any suitable means of authorizing a user to receive a distribution of ice from the ice delivery unit 100 including, but not limited to, free distribution, commercial distribution and programed restricted access. For a commercial distribution of ice from the ice delivery unit 100, forms of payment may include coins, paper money, electronic currencies, or any other means suitable for commercial exchange. For example, USA Technologies cashless payment systems and other similar systems can be used by the control unit 120. In an aspect, the control unit 120 is further configured to monitor and control the ice delivery unit 100, discussed in detail below. Once a user is authorized to receive a distribution of ice from the ice delivery unit 100, the unit is configured to deliver ice bag within a door-covered ice bagging cabinet 130.

FIGS. 2-15 illustrate components internal to an ice delivery unit 100 according to aspects of the present invention. In an aspect, the ice delivery unit 100 comprises a cabinet 110 with an upper section 112 and a lower 114 section. A frame 116 can support the cabinet 110. In an aspect, the upper section 112 of the cabinet 110 comprises an ice storage bin 200, a motor 210, pulleys 232, 240, 250, control unit 110 and ice chute 400 (see also FIG. 5). In an aspect, the lower section 114 comprises an icemaker 300, an ice bagging cabinet 130, insulated tubing (not shown), a thermal exchanger 500 (FIGS. 4-6), a water filter, an ozone treating system (neither shown) and any electrical wiring/circuitry (not shown) associated with operating the ice delivery unit 100.

In an aspect, the icemaker 300 is configured to make ice for the ice delivery unit 100. Water is delivered form an outside water source and travels through tubing that interacts with the heat exchanger 500, discussed in more detail below, before being delivered to the icemaker 300. In another aspect, the water, before being delivered to the heat exchanger 500, is filtered through a filtering system (not shown). In another aspect, the water can have an ozone treatment (not shown) applied to it as well before being turned into ice. In an aspect, the ozone treatment can be supplied by an ozone treatment system. In certain aspects, the ozone treatment and filtration systems can be off the shelf systems known in the art. In an aspect, the icemaker 300 can be configured to make compressed nuggets of ice. In an exemplary aspect, the icemaker 300 can be configured to make compressed chewable nuggets of ice. These nuggets of ice are cylindrical in nature. In an exemplary aspect, the nuggets are formed to be approximately ½ inch in diameter and range approximately between ½ inch to 1 inch in length. In other aspects, the nuggets can have other dimensions, but should have dimensions that allow for the transportation of the ice nuggets easily around corners and the like within the closed loop system of the ice delivery unit 100, and more specifically, the tubing of the closed loop system. The impact of the shape of the nuggets is discussed in more detail below.

In an aspect, the icemaker 300 is also configured to produce a large amount of ice while taking up a small footprint. For example, it is desirable for the icemaker 300 to have a height of approximately seven to eight inches in height, but yet be capable of producing approximately 1400-1500 lbs. of compressed nuggets of ice every 24 hours. In an exemplary aspect, the icemaker 300 can be supplied by Follet®. Such ice makers can be configured to produce 1450 lbs. of compressed chewable nuggets of ice every 24 hours and is described in detail at https://www.follettice.com/resources~resource-detail.aspx?tid=1565.

According to an aspect, a cross-sectional view of the icemaker 300 is shown in FIG. 7. The icemaker 300 uses a horizontal, cylindrical evaporator 310 to freeze water on its inner surface 312. The evaporator 310 is flooded with water and the level is controlled by sensors in a reservoir (not shown). A rotating auger 320 continuously scrapes ice from the inner surface 312 of the evaporator 310. The auger 320 moves harvested ice through the evaporator 310 into an ice extrusion canal 330. The ice is forced through a restrictive/compression nozzle 340 that squeezes out the water and creates the ice nuggets as discussed above. The excess water can then be captured in a bleed off tube (not shown) that carries the water back to the freezing chamber for recycling. The continuous extrusion process pushes the nuggets through a transport tube 350 into the bin 200, eliminating mechanical means outside of the ice machine to deliver the ice to the ice storage bin 200.

It should be noted that although the icemaker 300 selected for the disclosed embodiment is manufactured by Follet®, the ice delivery unit 100 can be configured to operate with any suitable icemaker 300 known in the art as long as the icemaker 300 can produce the ice nuggets approximate in shape and at rates approximate to those discussed above while maintaining a small footprint of the maker 300 within the ice delivery unit 100 while also providing the means of delivering the ice to the ice bin 200 without additional mechanical means, as discussed below.

Because the icemaker 300 produces compressed nugget ice, the ice can be routed through the ice transport tube 350 to an outlet nozzle (not shown) connected to the ice storage bin 200. In an aspect, the outlet nozzle is oriented at the top of the side of the ice storage bin 200. In an aspect, the tubing of the transport tube 350 is insulated and configured to provide ice from the icemaker 300 through the nozzle into the ice storage bin 200 of the ice delivery unit 100 through a closed loop system.

In an aspect, the icemaker 300 is located in lower section 114 of the cabinet 110, below the ice storage bin 200. In an aspect, the user assessable control unit 120, which controls the operation of the ice maker 300, is installed separately from and above the icemaker 300 (e.g., FIGS. 2-3), which can reduce the overall height of the icemaker 300. For example, prior art icemakers have a height of approximately two feet when the control unit 120 is integrated directly into the icemaker. In comparison, in an exemplary aspect, the overall height of the icemaker 300 is reduced to eighteen inches by separating the control unit 120 from the icemaker 300.

As discussed below, the transport tube 350 delivers the ice to a storage bin 200 located in the upper section 112 of the ice delivery unit 100. In an aspect, the ice storage unit 200 is a large capacity hopper made from natural HDPE plastic. The plastic material is designed to retard the growth of bacteria and mold. In other embodiments of the present invention, the ice storage unit 200 can be constructed from galvanized steel, other molded plastic, stainless steel, or any other suitable material. In an exemplary aspect, the storage bin 200 is approximately 43 inches in length, 31 inches wide and a height of 79 inches, and is configured to hold approximately 1200 lbs. of ice at a given time. However, in other aspects, the storage bin 200 can be of various sizes that fit within the desired footprint of the ice delivery unit 100 that can hold the amount of ice needed.

The location of the icemaker 300 within the ice delivery unit 100 is designed to enable the ice storage bin 200 to be of a larger capacity than ice delivery units currently known in the art. Prior art ice delivery units place their icemakers, usually with a height of two feet, over the storage bin. Most of these systems institute icemakers that generate ice on trays and then require gravity to dispense them into the storage bins, therefore requiring them to be placed at the top of a storage bin. Further, these systems require an air gap (approximately six to twelve inches) between the bottom of the ice maker and the top of the ice stored within a bin; otherwise, blockage can occur. Placing the icemaker over the storage bin requires the overall height of the ice delivery unit to be higher, which is already restricted by outside factors (e.g., fitting under overhangs). Therefore, the icemaker height and placement impacts the overall height of the delivery unit and can reduce the capacity of the storage bin in prior art systems. In addition, most prior art units, the ice cabinet, or the location at which the ice is delivered to the customer, is placed either by itself leading to wasted space, or eats into the size of the ice container unit.

Placing the ice machine 300 under the ice storage bin/unit 200 can reduce the overall height of the delivery unit 100 without requiring a reduction in height of the storage bin 200. By decreasing the height of the icemaker 300, the storage bin 200 can be placed at a lower position within the cabin 110, allowing for a larger storage bin 200 with an expanded height within the cabinet 110, and thereby increasing capacity of storage. By reducing the combination of the height of the icemaker 300 and placing it under the storage unit 200, the overall height of the delivery unit 100 is reduced, allowing the machine to be placed under most overhangs in front of stores. Additionally, the location of the icemaker 300 (i.e., in the bottom portion 114 of the unit 100 adjacent the ice bagging cabinet 130 and below the ice chute 230) reduces the overall size, particularly the overall height of the ice delivery unit 100 by approximately thirty inches (10 feet from prior art systems to 7 feet tall). Further, by placing the icemaker 300 adjacent the ice bagging cabinet 130, all available space is utilized within the cabinet 110. In addition, utilizing an icemaker 300 that creates cylindrical ice nuggets that can be pushed up through the tubing 350 and then dropped into the top of the storage bin 200, no large gap is required at the top of the storage unit 200, utilizing all space within the bin 200 while improving the efficiency of the ice delivery unit 100 by eliminating warmer air in the storage bin 200 caused by a gap, which can lead to ice melting. Further, problems with blockage found in systems using tray ice making systems are eliminated. The combination of smaller height of the icemaker 300 and the larger and lower mounted storage bin 200 provides large capacity storage without expanding the footprint of the ice delivery unit 100. The combination of the type and placement of the icemaker 300 in the ice delivery unit 100 is novel to the common practice of placing icemakers atop ice distribution units, where the icemaker routinely takes as much as 30 inches of height on top of an ice bin. Placing the icemaker 300 in the lower section 114 of the ice delivery unit 100 allows for a larger capacity ice storage area while maintaining a small footprint.

In an aspect, the combination of the size of the bin 200, the orientation of the icemaker 300, as well as the type of ice made, allows the ice delivery unit 100 to be capable of holding approximately 1000-1200 lbs of ice at any given time as well as produce 1400 lbs. of ice in a day (a twenty-four hour period). Typical commercial demands of ice distribution units require a distribution of approximately 1800 lbs. of ice per day. The capacity of the ice delivery unit 100 is configured to accommodate such demands while still retaining a small footprint desired by retailers utilizing the ice delivery units 100.

The closed loop system, which is made up of the icemaker 300, the transport tube 350, and the storage bin 200, enables improved ice storage sanitation in comparison to other ice delivery units known in the art. The closed loop system comprises a special lid 201 (see FIGS. 8 and 11) configured for the storage bin 200 that can be readily removed to allow for cleaning and sanitizing of the inside of the ice storage bin 200. In an aspect, the lid 201, when in place, reseals the ice storage bin 200, such that the presence and possibility of external contaminants (e.g. dust, bugs, bacteria, dirt, and other contaminants) within the stored ice supply is eliminated. In an aspect, the lid 201 is configured to form a seal (e.g., an O-ring) when mating with a corresponding aperture (not shown) in the bin 200. In an exemplary aspect, the bin 200 is milled flat, preventing the lid 201 from extending beyond the surface of the bin 200. The lid 201 is then attached every six inches to the top of the bin 200 with stainless screws insuring positive seal 360 degrees between the top of the bin 200 and the lid 201. In an aspect, the lid 201 is approximately 16 inches wide by 24 inches long. In an aspect the lid 201 can be removed to allow for cleaning and sanitizing of the ice storage bin 200. After cleaning, the lid 201 may be put back in place such that the ice store unit 200 is sealed from dust, bugs, dirt and/or any other outside contaminate. As discussed above, the combination of the icemaker 300 feeding into the ice storage bin 200 creates a closed loop system until the ice is delivered, preventing contamination. In exemplary aspects, the closed loop system includes a water filtration system and ozone treatment system for the water before it reaches the icemaker 300.

Figure 4:
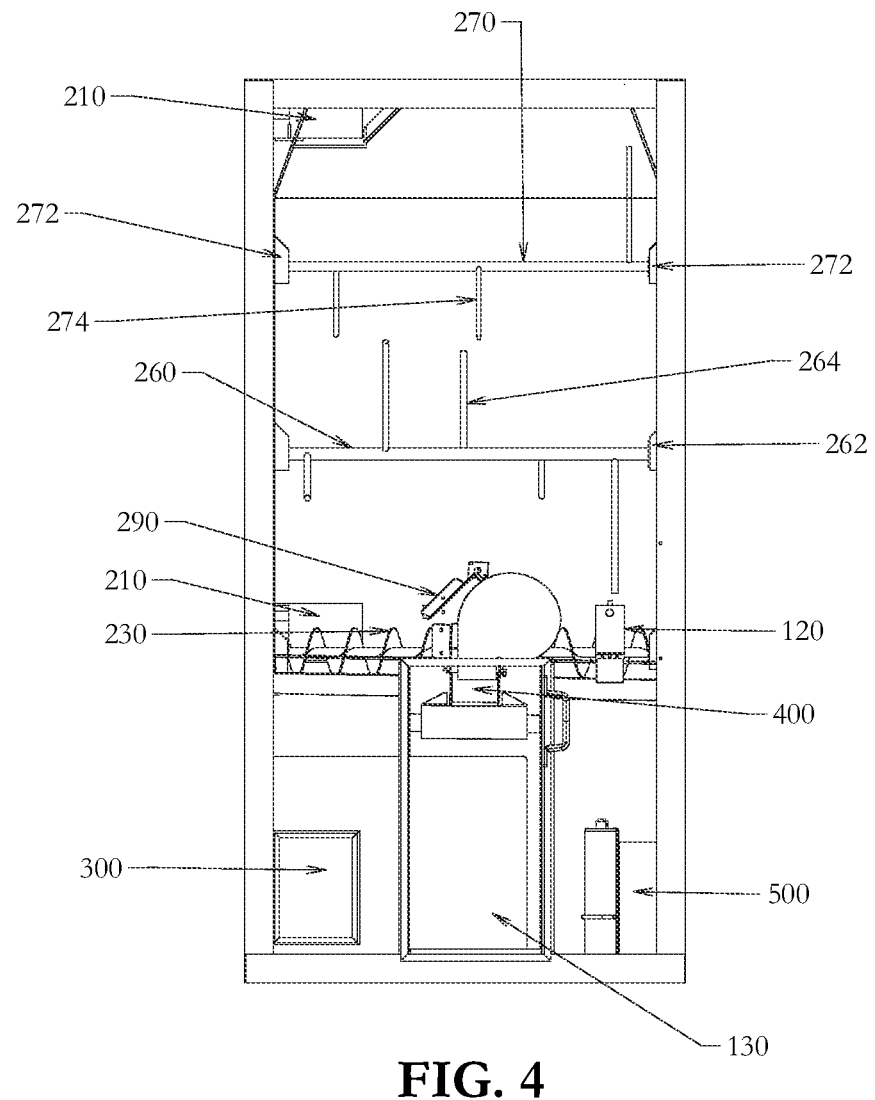
FIG. 4 is a front plan view of components internal to an ice delivery unit according to aspects of the present invention.
Figure 5:
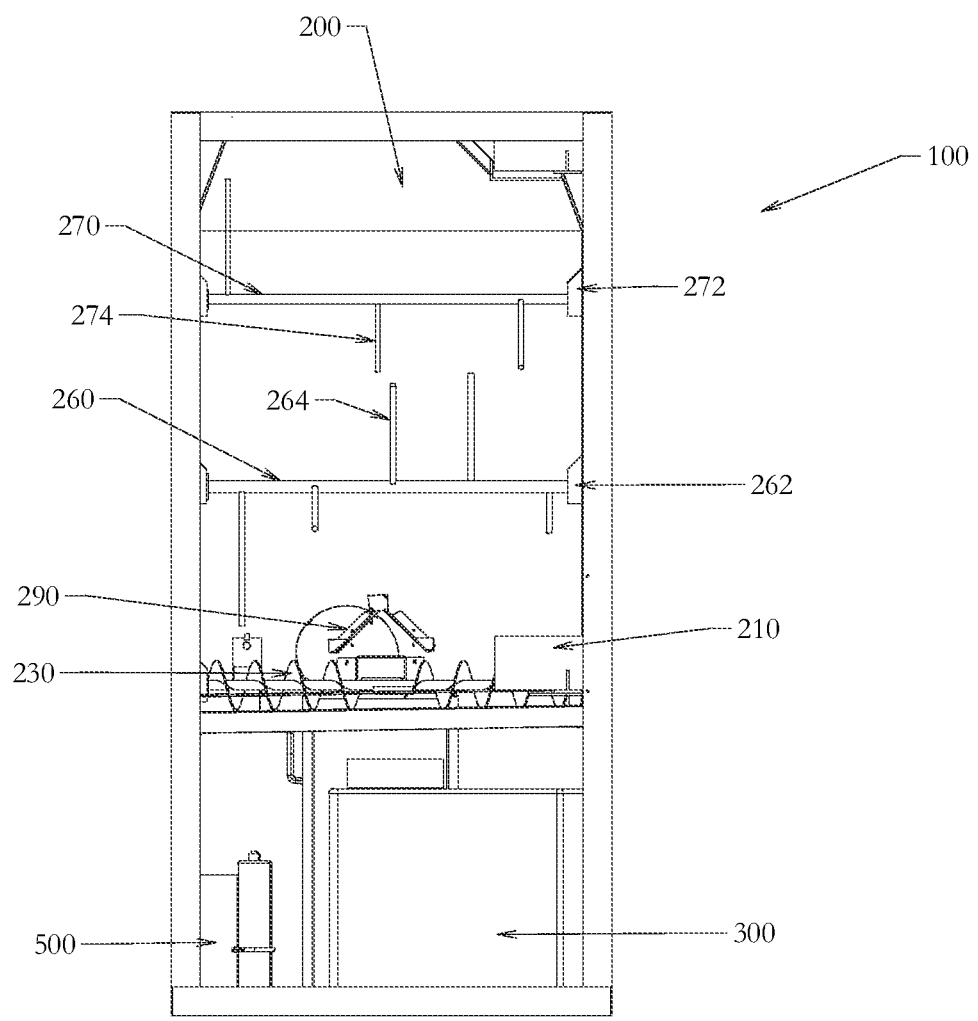
FIG. 5 is a rear plan view of components internal to an ice delivery unit according to aspects of the present invention.
Figure 6:
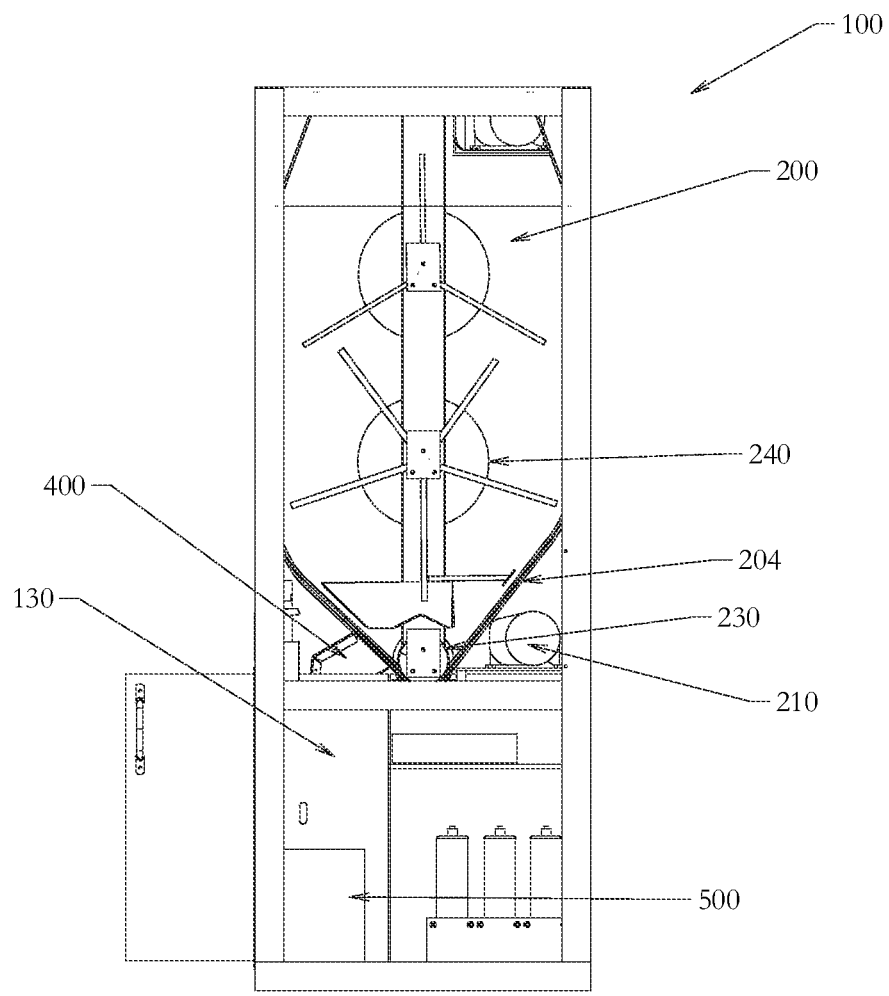
FIG. 6 is a side view of components internal to an ice delivery unit according to aspects of the present invention.
Figure 8:
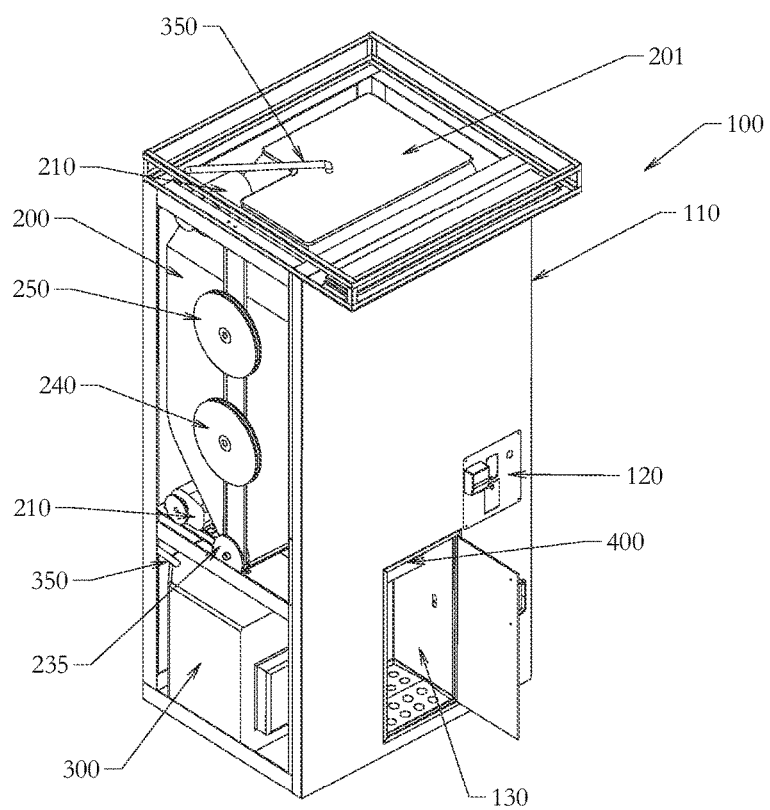
FIG. 8 is a top perspective view of an ice delivery unit according to aspects of the present invention.
Figure 9:
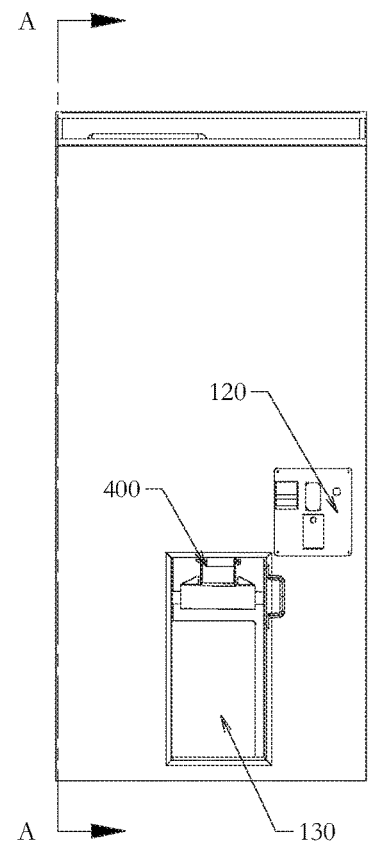
FIG. 9 is a front plan view of the ice delivery unit of FIG. 8.

In an aspect, the ice storage unit 200 is insulated. Adequate insulation may be accomplished by the use of 100-150 mm of cork, two inches of closed cell spray foam, or any other material of necessary thickness suitable to provide thermal insulation of the stored ice. In an aspect, the ice storage unit 200 comprises at least one drain hole (not shown) at the bottom of its tank through which water from melted ice is released and directed towards a thermal exchanger 500 (FIGS. 4-6). The drain holes can include a one-way valve, allowing only water to exit through the drain holes. The drain holes drain into a catch basin (not shown), which is positioned above the heat exchanger 500.

In an aspect, the ice storage unit/bin 200 features a V-shaped trough 204 oriented at the bottom 202 of the bin 200. In an aspect, the V-shaped trough 204 is configured to further funnel the ice to the ice chute 400, discussed in detail below. In addition, the V-shaped trough 204 is configured to contain an auger 230 (FIG. 3), which is controlled by pulley/sprocket 235. In an aspect, the pulley/sprocket 235 is driven by a belt/chain connected to a motor 210. In a preferred embodiment, the motor 210 is a ¼ HP single-phase motor 210. However, other types of motors can be used to ultimately drive the pulley 235 to drive the auger 230. In an aspect, the control unit 110 is configured to control the operation of the motor 210. For example, the motor 210 may be an AC motor, DC motor, stepper motor, or any motor suitable for operation within the ice delivery unit 100. In an aspect, the motor 210 can actually be a combination of one or motors. In an aspect, one of the motors 210 is connected to at least one belt (not shown) and is also configured to drive other pulleys 240, 250 configured to drive agitator shafts 260, 270, discussed in more detail below. In another aspect, the motors 210 may be configured to operate in sequence or independent from each other.

Figure 3:
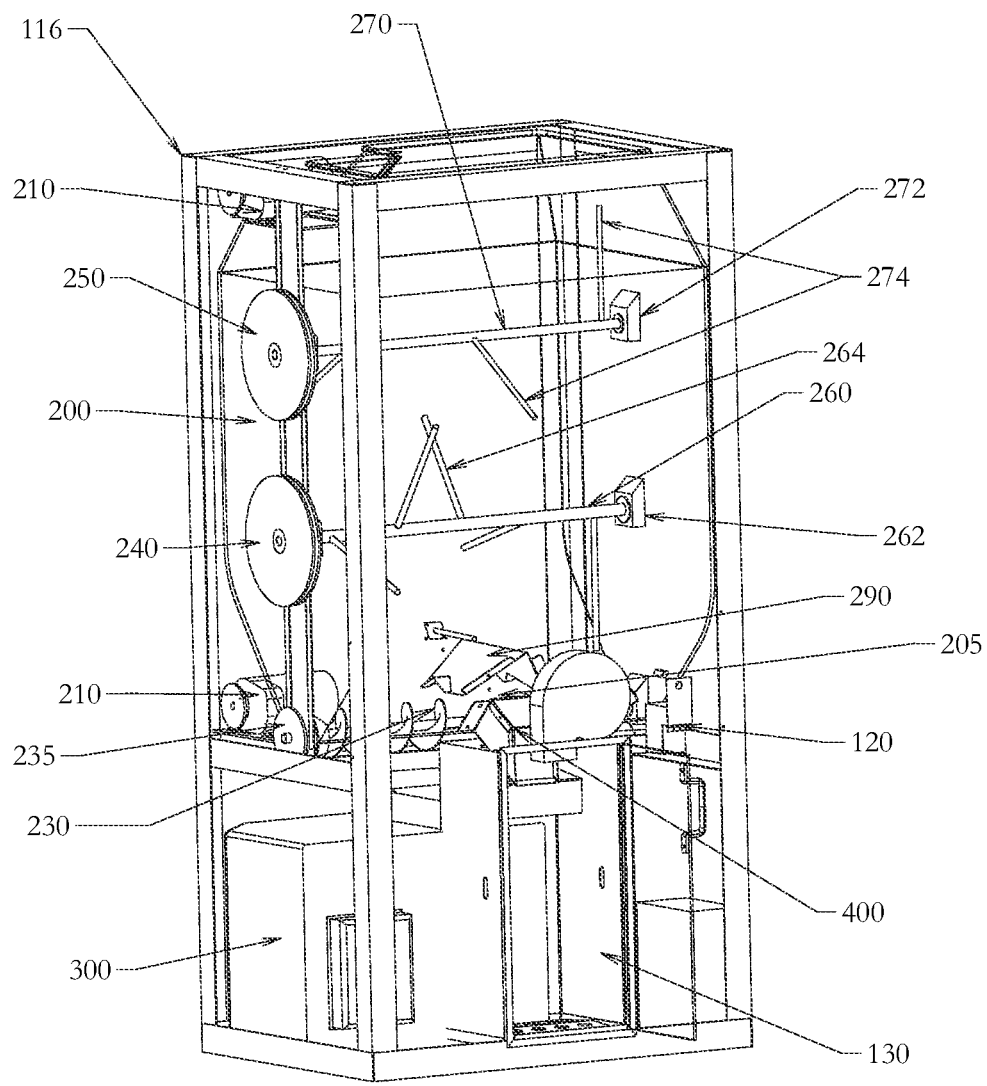
FIG. 3 is an isometric view of internal components of the ice delivery unit of FIG. 1.

FIG. 3 illustrates components internal to an ice delivery unit 100 according to aspects of the present invention. Internal to the ice storage unit 200 are agitator shafts 260 and 270. Agitator shafts 260 and 270 are each positioned horizontally for the length of the ice storage unit 200 and connect, respectively, to pulleys 240 and 250 through sealed openings on the body of the ice storage unit 200. In an aspect, the agitator shafts 260 and 270 are designed to rotate smoothly and effortlessly without lubrication. In such aspects, the shafts 200D and 200E are held within high density plastic square blocks 262 and 272 (other ends not shown) that tightly engage the shafts 260, 270 themselves.

In a preferred embodiment of the present invention, the agitator shafts 260, 270 are approximately 40 inches in length and feature intermittently positioned prongs 264, 274 that extend from them. In an aspect, the prongs 264, 274 are approximately ½ inch in diameter and 14 inches long. When driven by a motor 210, the agitator shafts 260, 270 rotate. The rotation of agitator shafts 260, 270 causes prongs 264, 274 to agitate ice stored in the ice storage unit 200 such that the ice is unbridged. In addition, the motors 210 are configured to rotate the shafts 260, 270 at very slow rates in order to increase the life of the components. In an exemplary aspect, the agitator shafts 260, 270 are configured to rotate at approximately 6 RPM.

In an aspect, agitation (through the agitators 260, 270), gravity, and the auger 230 cause ice within the ice storage unit 200 to be directed towards the bottom of the bin 200. In an aspect, the bottom 202 of the unit 200 is a V-shaped structure 204 with declining surfaces further direct ice towards the bottom center of the ice storage unit 200 where the ice interfaces with an auger 230.

Figure 13:
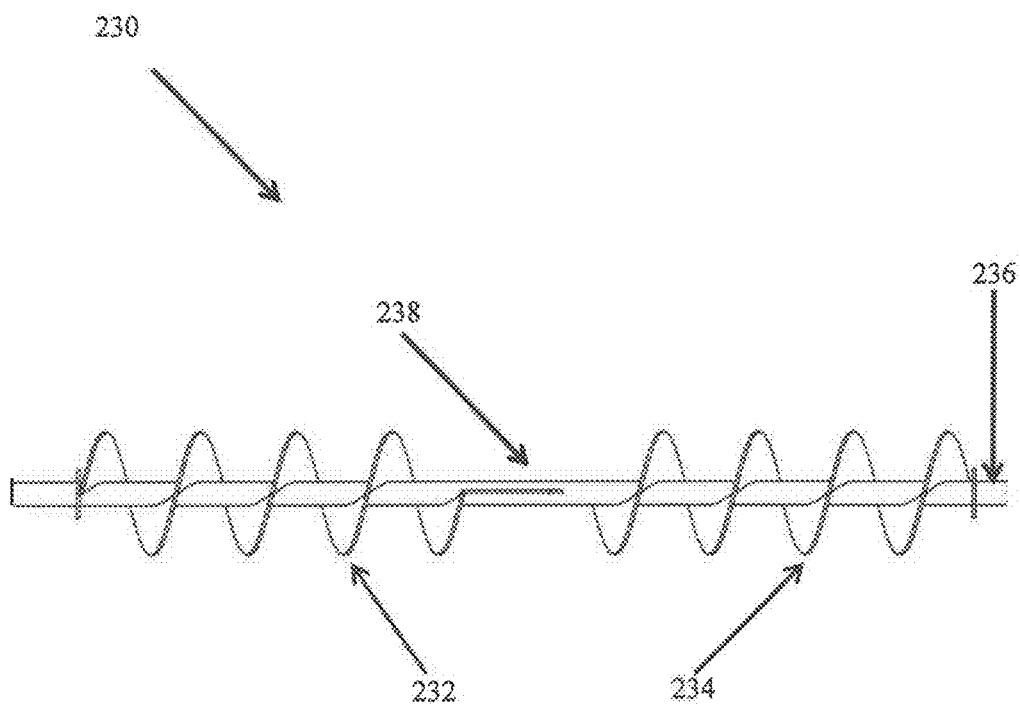
FIG. 13 is a perspective view of an auger with dual-directional flights according to aspects of the present invention.

FIG. 13 is a schematic drawing of an auger 230 with dual-directional flights 232, 234 along a shaft 236 according to aspects of the present invention. In an aspect, the auger 230 is approximately 40 inches in length and is positioned horizontally within the ice storage unit 200. In an aspect, each section of the flights 232, 234 is approximately 14 inches in length, leaving a middle section 238 of shaft 236 of the auger 230 with no flights. The shaft 236 of auger 230 interfaces with pulley 235 through a sealed opening in the body of the ice storage unit 200. As illustrated in FIG. 3A, the shaft 236 of auger 230 features both left-hand flights 232 and right-hand flights 232.

Referring to FIG. 3, the bin 200 includes an ice shield 290. The ice shield 290 includes declined surfaces to cover an opening 205 within the V-shape trough/structure 204 of the bin 200 and parts of the auger 230 to prevent ice from free flowing out of the bin 200. More specifically, the shield 290 covers the opening 205 and the part of the auger 230 where the paddles/flights 232, 234 are located to push the ice out of the opening 205 and into an ice chute 400. In an aspect, when pulley 235 is driven by motor 210, the shaft 236 of auger 230 rotates. As the shaft 236 rotates, the flights 232, 234 guide stored ice to the center of the ice storage unit 200 for discharge through ice chute 400 (see also, FIG. 5) inside of the ice bagging cabinet 130.

The configuration of the flights 232, 234 of the auger 230 provides a great benefit over prior art ice dispensing units. For example, other units that use augers to dispense ice move the ice to one end of the unit. In such embodiments, the auger is between 4' to 7' in length and by the time the ice has traveled that far through the bottom of the bin, the ice is degraded and broken up and in poorer quality. In the ice delivery unit 100 of the present invention, because the ice comes from both ends of the bin 200 at the same time, the ice is only traveling a much smaller distance. For example, in an exemplary aspect as shown in FIG. 4, the ice travels 14" each way, delivering unbroken full, uniform, round cylinders of ice. In addition, the orientation of the auger flights 232, 234 along the shaft 236 also reduces the requirement for energy by 70% and allows for a reduced rpm of the auger as well as lower HP requirements and run time for delivery. For example, the current ice delivery unit 100 can deliver 10 to 14 lbs. of ice in 8 seconds whereas the prior art units take up to 20 seconds to deliver a bag of ice with 3 times the HP in motors. Further, prior art ice vending units discharge the ice on one "end" of the storage tank making it necessary to have up to 16 additional inches on that end to accommodate the motor and auger drive mechanism. By having a center discharge auger 230 and chute 400 and placing the motor 210 under the storage unit 200, due to the V-shaped trough 204, space is saved and the overall length of the unit 100 is decreased while increasing the size of the storage unit 200 to hold more ice.

Figure 14:
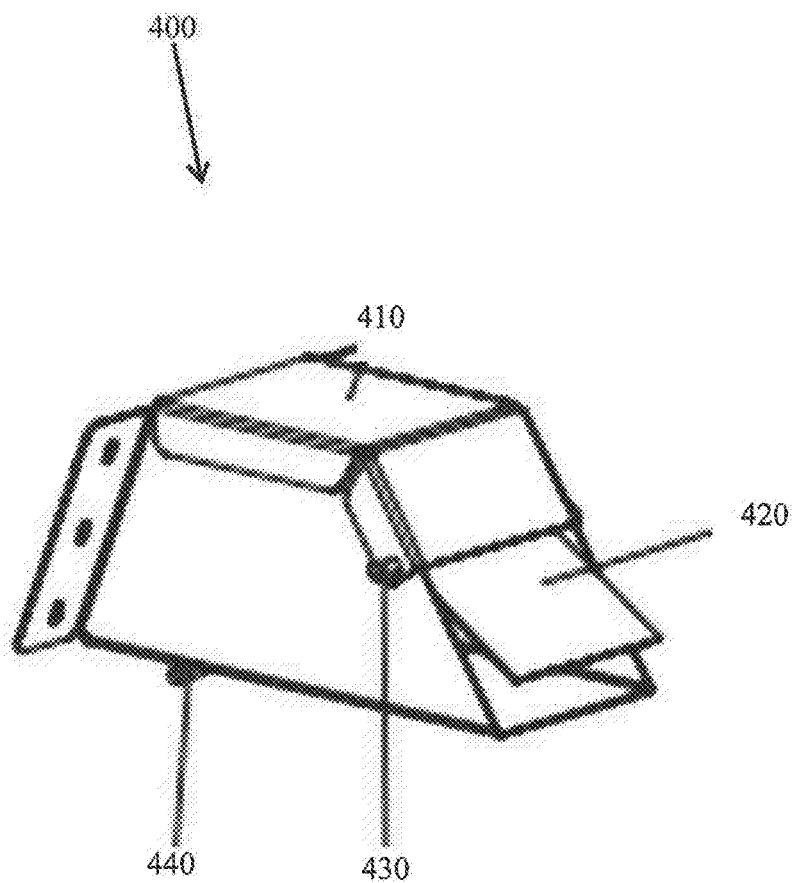
FIG. 14 is a perspective view of an ice chute according to aspects of the present invention.

FIG. 14 illustrates an ice chute 400 according to aspects of the present invention. As discussed above, the ice chute 400 provides the ice to the consumer. In an aspect, the ice chute 400 feeds into the ice bagging cabinet 130. In an aspect, the ice chute 400 is constructed from 16-gauge stainless steel. However, the ice chute 400 can be constructed from any material suitable for operation within the ice delivery unit 100. In an aspect, the ice chute 400 can include sensors (not shown) that can monitor the amount of ice that exits the ice chute 400. For example, the sensor can include a photo cell that determines how much ice goes into a bag in the ice bagging cabinet 130. In an aspect, the ice chute 400 features a cover 410 and a safety door 420. The cover 410 prevents contaminants from entering the ice chute 400. The safety door 420 stays closed due to its weight. Whenever ice is delivered to the ice chute 400, the weight of the ice causes the safety door 420 to open and disperse the ice. Once the flow of ice is stopped (that is, the ice stops dropping from the bin 200), the safety door 420 closes due to its weight.

The above construction of the ice delivery chute 400 forms a "one-way" chute 400 that will allow ice to free flow out of the unit 100 but will not allow any contaminants or insects to find their way into the ice bin 200. All other ice delivery units of the prior art have chutes and ice fully exposed to the air. Therefore, all ice is in the prior art units are exposed to anything that can craw or be blown into the unit from outside. In an aspect, the door 420 is machined so that there is little clearance (e.g., 3/32 inches) between the chute door 420 and the sides of the chute 400. When the safety door 420 is closed, in combination with the cover 410, contaminants are thwarted from entry into the ice storage unit 200. Additionally, a closed safety door 420 can prevent a user from placing an arm or other body part into the ice chute 400 where it could potentially be damaged by coming in contact with the auger 230. In an aspect, ice chute 400 features a bag holder support rod 430 and a bag holder lock pins 440 which interface with bag holder 450 to secure a bag holder 450 in place.

Figure 15:
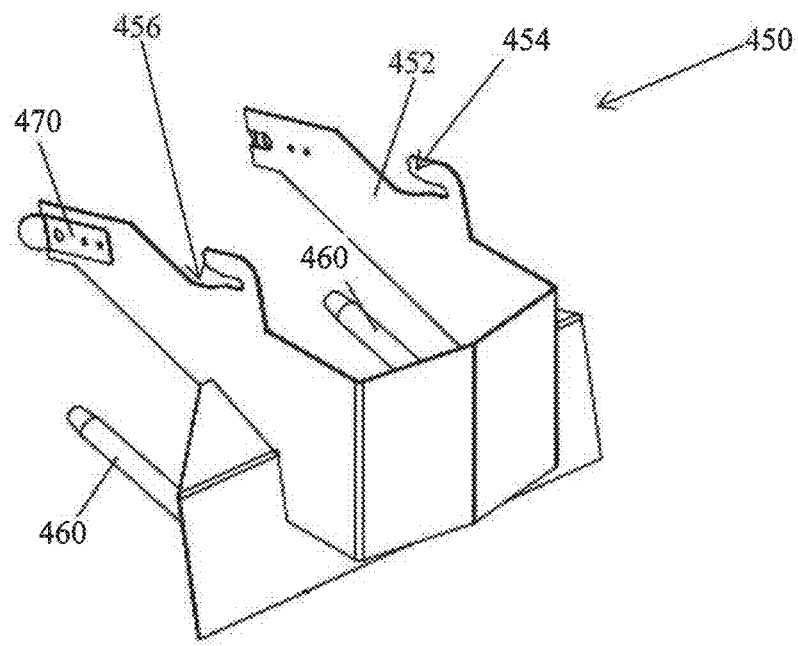
FIG. 15 is a perspective view of the bag holder.

FIG. 15 illustrates a bag holder 450 according to aspects of the present invention. The bag holder 450 includes a one piece frame 452. The frame 452 includes interlocking notches 454 and 456. The notches 454, 456 are configured to self-align with the bag holder lock pin 440 and bag holder support rod 430 of the chute 400. Bag support tubes 460 are also included. In an aspect, the bag holder tube 460 can include a 5/8 SS tube configured to hold bags.

A spring clip 470 can be utilized by the bag holder 450. The spring clip 470 can be pulled out to allow the rear pin (440) to be captured by the clip 470 when it is in place and also allow the clip 470 to be removed in the same manner. The process of loading the bags is as follows: out the clip 470, slide off the bag holder 450, load it with bags, and then slide the bag holder 450 back in place. Prior art bag holders require tools to take off and put back on or four hands to get it back in place. In an aspect, the bag holder 450 is designed to be removed from the ice delivery unit 100 by unclipping two spring type latches 470 and sliding the bag holder 450 off of the bag holder lock pins 440 on each side of the ice chute 400. As such a user is able to place bags onto the bag holder 450 from a wire wicket (not shown) using one hand on to a specially designed bag loader (not shown, but which is configured to interact with the tubes 460) and then transferred onto the bag holder 450. In an aspect, the bag holder 450 is designed to hold up to 2500 bags. The bag holder 450 can then be slid back into place in the ice delivery unit 100 utilizing only one of the user's hands and the holder 450 will automatically re-latch itself without the need to bolt, tighten, loosen, or make any additional operations to attach the bag holder 450 into its place in the bag bin. As such the operation for restocking ice delivery bags is simplified.

FIGS. 4-5 illustrate components internal to an ice delivery unit 100 according to aspects of the present invention. In FIG. 4 the door of ice bagging cabinet 130 is open to reveal the bag holder 450 interfaced with the ice chute 400. It is expected that some ice within the ice delivery unit 100 that is not discharged to a user through the ice chute 400 will melt. To improve efficiency, the ice delivery unit 100 is configured to take advantage of such phenomenon through a unique thermal exchange system. Because of the thermal exchange system 500 the icemaker 300 will be able to maintain 98% efficiency on the hottest day of the summer.

Referring still to FIG. 4, in an aspect, the ice box delivery unit 100 utilizes a thermal exchanger 500 located in the lower section 114 configured to collect melted ice water released from the ice storage unit 200 through a drain hole. The melted ice water leaves the ice storage unit 200 at approximately 40° F. The drain hole connects to a vertical tube (not shown) with a discharge point 1 inch lower than the inlet of thermal exchanger 500. The inlet of the thermal exchanger 500 takes in new water to be used in the icemaker 300. The melted ice water exits the ice storage unit 200 slowly through the vertical tube into the thermal exchanger 500. By bringing the incoming new water (average 80 degrees) in a flexible ⅜ plastic tube (not shown) in through the outlet side of the thermal exchanger 500, the cool melted water from the storage unit 200 cools off the incoming water, and fresh water exits through the inlet side of the thermal exchanger 500 at a much colder temperature (about 60 degrees). From the thermal exchanger 500, the water continues through additional tubing. The ⅜ tube is also then run next to the bottom 202 of the ice bin 200 along its length to further cool the water to around 45 degrees before it enters the ice making unit 300. In essence, the incoming water goes through two thermal exchangers before being cooled—the thermal exchanger 500 and the ice storage unit 200—before getting to the icemaker 300. This reduces the energy cost for the production of ice but more importantly the time in which it takes to freeze the water into ice therefore increasing the efficiency of the icemaker by 35 to 40% on a 90-degree day. In an aspect, the melted water exits the thermal exchanger 500 through a different tube (not shown), which terminates in a sealed opening in the cabinet 110 to be drained outside of the unit 100.

In an aspect, the ice delivery unit 100 also includes a pressurization system (not shown) that is configured to capture all of the melted ice water and return it to the closed tubing system for additional use. In an aspect, the pressurized system returns the water in the closed loop system before filtration and ozone treatment systems.

In an aspect, when a user wants to obtain ice from the ice delivery unit 100, the user interacts with the control unit 120. With the control unit 120, the user selects the amount of ice wanted and pays for the ice. The control unit 110 can be configured to require payment before performing any more actions. In addition, the control unit 110 can be configured to only allow only a predetermined amount of ice (e.g., 12 lbs. bag only), or can allow the user to select from a range of amounts.

Once the selection of ice has been completed, the control unit 110 can initiate the process of distributing ice by initiating the auger 230. In an aspect, the control unit 110 can call on the motor 210 to begin rotation, while also determining how much ice has been purchased. In an aspect, the unit 100 can monitor how much ice has been delivered based upon using a photo cell to measure the ice within a bag or that has travelled through the chute 400, or can measure the number of rotations of the auger 230. Once the amount has been reached, the auger 230 is deactivated.

In another aspect, the bin 200 can be provided with sensors to measure the amount of ice within the bin 200. The sensors can be configured to send such information to the control unit 110. If the sensor reports to the control unit 110 that the ice level is below a certain threshold, the control unit 110 can call upon the icemaker 300 to produce more ice until the desired level of ice is present.

In an aspect, the control unit 110 can be configured to control the rotation of the agitators 260, 270 to prevent the ice from bridging. In an exemplary aspect, the agitators 260, 270 can be configured to agitate the ice at given time intervals for given periods of time. For example, the agitators 260, 270 can be configured to rotate every three hours for approximately three seconds. Along the same lines, a timer can be reset when a bag of ice has been filed in order to delay or advance the activation of the agitators 260, 270.

Having thus described exemplary embodiments of the invention above, it should be noted by those skilled in the art that the within disclosures are exemplary only and that various other alternatives, adaptations, and modifications may be made within the scope of the present invention. Accordingly, the present invention is not limited to the specific embodiments as illustrated herein, but is only limited by the following claims.

What is claimed is:

1. An ice delivery unit comprising:
   a movable cabinet configured to be located inside and outside buildings, and the entire cabinet further configured to be located upon a single supportive surface, said movable cabinet comprising an upper section and a lower section;
   an ice storage unit located within the upper section of the movable cabinet;
   an icemaker located within the lower section of the movable cabinet directly under the ice storage unit in order to reduce footprint of the movable cabinet, wherein the icemaker is configured to create cylindrical ice nuggets; and
   tubing connecting the icemaker to the ice storage unit, wherein the icemaker is further configured to push the cylindrical ice nuggets through the tubing.

2. The ice delivery unit of claim 1, further comprising water filter and ozone treatment systems configured to treat water before going to the icemaker.

3. The ice delivery unit of claim 1, further comprising a control unit, wherein the control unit controls the icemaker, wherein the control unit is connected to and oriented above the icemaker, and accessible externally.

4. The ice delivery unit of claim 1, wherein the tubing includes a compression nozzle that squeezes out excess water surrounding the cylindrical ice nuggets.

5. The ice delivery unit of claim 1, further comprising a thermal exchange system, wherein the thermal exchange system takes melted ice water from the ice storage unit to cool new water entering the movable cabinet before entering the icemaker.

6. The ice delivery unit of claim 5, further comprising additional tubing that takes water chilled by the thermal exchange system adjacent the ice storage unit to further cool the water before entering the icemaker.

7. The ice delivery unit of claim 6, wherein the icemaker, the tubing, the additional tubing, and the ice storage unit form a closed loop system that prevents outside contaminants into the cylindrical ice nuggets.

8. The ice delivery unit of claim 1, wherein the ice storage unit comprises:
   a top portion, wherein the tubing is connected at the top portion of the ice storage unit;
   a bottom portion, wherein the bottom portion comprises a v-shaped trough; and
   an auger, wherein the auger is oriented in the bottom portion of the ice storage unit.

9. The ice delivery unit of claim 8, wherein the ice storage unit comprises agitators located in the top portion to agitate ice to prevent bridging.

10. The ice delivery unity of claim 8, wherein the ice storage unit further comprises an opening in the v-shaped trough, the opening located in a middle of the ice storage unit.

11. The ice delivery unit of claim 10, wherein the auger is configured to move ice towards the middle of the ice storage unit and out the opening.

12. The ice delivery unit of claim 11, wherein the auger is driven by a motor and comprises a first section having flights oriented in a first direction and a second section having flights oriented in a second direction, wherein the first and the section directions are different from one another and are configured to move the ice towards the middle of the ice storage unit.

13. The ice delivery unit of claim 12, wherein a second auger within the icemaker is located directly below the ice storage unit in order to reduce the footprint and internal space utilized within the movable cabinet.

14. The ice delivery unit of claim 1, further comprising an ice chute feeding into an ice bagging cabinet, wherein the ice chute is connected to a bottom portion of the ice storage unit and feeds into the ice bagging cabinet.

15. The ice delivery unit of claim 14, wherein the icemaker is located laterally adjacent to the ice bagging cabinet in order to reduce the footprint of the movable cabinet.

16. The ice delivery unit of claim 14, wherein the ice chute comprises a weighted door, wherein the weighted door is configured to allow only egress of ice.

* * * * *